United States Patent
Chlebcova et al.

(10) Patent No.: US 11,354,837 B2
(45) Date of Patent: Jun. 7, 2022

(54) GEOGRAPHIC INDEXING

(71) Applicant: KBC Groep NV, Brussels (BE)

(72) Inventors: Martina Chlebcova, Nitra (SK); Viera Kovalova, Bratislava (SK); Barak Chizi, Woluwe (BE); Jeroen D'haen, Sint-Amandsberg (BE)

(73) Assignee: KBC Groep NV, Brussels (BE)

( * ) Notice: Subject to any disclaimer, the term of this patent is extended or adjusted under 35 U.S.C. 154(b) by 0 days.

(21) Appl. No.: 17/058,505

(22) PCT Filed: Jun. 25, 2019

(86) PCT No.: PCT/EP2019/066745
§ 371 (c)(1),
(2) Date: Nov. 24, 2020

(87) PCT Pub. No.: WO2020/002281
PCT Pub. Date: Jan. 2, 2020

(65) Prior Publication Data
US 2021/0192812 A1    Jun. 24, 2021

(30) Foreign Application Priority Data

Jun. 25, 2018   (EP) .................................. 18179588

(51) Int. Cl.
*G06T 11/20*     (2006.01)
*G06F 17/15*     (2006.01)

(52) U.S. Cl.
CPC ............ *G06T 11/206* (2013.01); *G06F 17/15* (2013.01)

(58) Field of Classification Search
CPC .............................. G06T 11/206; G06F 17/15
See application file for complete search history.

(56) References Cited

U.S. PATENT DOCUMENTS

2017/0052655 A1  2/2017  Cervelli
2017/0365093 A1  12/2017 Stacey
2018/0053326 A1  2/2018  Ingrassia

FOREIGN PATENT DOCUMENTS

EP      2070006 B1      9/2006
EP      2593751 B1      5/2013

OTHER PUBLICATIONS

ISR/WO for parent application PCT/EP2019/066745 dated Aug. 14, 2019.
Markus Neteler, et al., "Open Source GIS: A GRASS GIS Approach Second Edition," 2004.

*Primary Examiner* — Jeffery A Brier
(74) *Attorney, Agent, or Firm* — Vorys, Sater, Seymour and Pease LLP (57) ABSTRACT

The current invention relates to a computer-implemented method for creating an overlay map, preferably a heat map, comprising: receiving at a server a user request for creation of the overlay map; loading vector data at the server comprising location data, the location data comprising at least one attribute; converting the vector data to image data composed of pixels according to an index scale; applying the converted image data to a color ramp; and creating the overlay map based on the converted image data and the color ramp; wherein said vector data is organized according to a plurality of layers, the location data comprising at least one attribute for each layer.

17 Claims, 1 Drawing Sheet

GEOGRAPHIC INDEXING

TECHNICAL FIELD

The invention pertains to the technical field of geographic information system (GIS) applications, particularly to GIS applications for the generation of overlay maps such as heat maps, and may therefore pertain to G06T11/206.

BACKGROUND

Overlay maps, such as choropleth maps and particularly heat maps, are an emerging and attractive instrument for data analysis in GIS applications, with important applications. Heat maps, as an instrument of data analysis, have the potential to organize data in a way that is overall intuitive and at the same time very accurate when it comes to informing a user on the presence, number and nature of local extrema present in the data. A recent example is the heat map indicating the probable location of missing Malaysia Airlines Flight 370 based on a Bayesian method analysis of possible flight paths of the aircraft, as reported in [MH370—Definition of Underwater Search Areas (PDF) (Report), Australian Transport Safety Bureau, 3 Dec. 2015]. Obviously, such a heat map may be of crucial value to rescue workers during rescue operations, requiring an instrument of data analysis that may be used also by non-experts, and which may be interpreted correctly with a minimum of prior comment.

The generation of these maps however brings about several challenges, of which the inherent clustering required for heat map generation is particularly challenging. Often, the data underlying the heat map is not clustered in such a way to bring out trends. On the other hand, without such clustering it is often difficult or impossible to infer anything about general overall patterns. Existing approaches often suffer excessive computational complexity, making it difficult for the user to interact with data in real time to visualize said data.

EP 2 070 006 and US 2018/0 053 326 A1 disclose a method for providing mapping, data management and analysis. Creation of a map is initiated with a desired Gaussian aggregation and desired color map parameters. Data is loaded to be utilized in the map. The data is rasterized, then converted to a certain scale. A convolution operation is performed on the data. The convolution results are applied to a color ramp, and the map is created based on the color ramp and the convolution results. While the method is aimed at reducing computational complexity of overlay map generation, it lacks flexibility and is computationally complex with respect to the organization of data that may be represented on the map. US 2018/0 053 326 A1 in particular discloses creation of a map for the intersection of data, by multiplying a grid/vector result of a first data set by a grid/vector result of a second data set.

EP 2 593 751 discloses an indoor likelihood heatmap. For certain example implementations, a method for a device may comprise projecting multiple grid points over a schematic map of an indoor area, with the schematic map indicating multiple obstructions of the indoor area. Feasible paths between grid point pairs of the multiple grid points may be determined. For a particular grid point of the multiple grid points, a count of the feasible paths that traverse the particular grid point may be determined. A likelihood heatmap for use in one or more navigational applications may be generated based, at least in part, on the count. EP 2 593 751 lacks provision for flexible and computationally efficient calculation of heat maps. This relates to the particular aim of EP 2 593 751, being directed at providing heat maps based on the projection of grid points and the determining of feasible paths between said grid points.

US 2017/0 052 655 A1 discloses interactive user interfaces containing interactive maps. In response to user interaction with a map at a client system, tile layers are generated using server-side components, assembled into map tiles, and transmitted to client-side components to be displayed to the user. In an embodiment, it is determined whether the layers necessary to compose the requested map tiles are cached. When a layer is not yet cached, that layer may be composed and cached for future retrieval. The document remains silent on specific composition methods.

The present invention aims to resolve at least some of the problems mentioned above.

SUMMARY OF THE INVENTION

A key advantage of the invention lies in its agility with respect to adding and removing data layers. New layers can be added generically without complicating matters. Overall, in the present invention, the effort required to handle new layers may be proportional to the number of layers added, whereas in prior art methods and systems it is typically more than proportional to it, for instance being proportional to the total number of layers, including both the number of old and new layers. Furthermore, in the present invention, the effort required when removing layers is drastically mitigated when compared to prior art methods and systems, typically requiring substantial calculation upon the omission of a data layer.

Hence, the invention provides efficient organization of calculations with respect to different data layers. While data sets in GIS commonly comprise several layers, the conversion of this data into an overlay map representation often approaches these different layers in a joint manner, without taking into account the typical use case wherein one or more data layers may be removed or added by a user, and an updated overlay map is to be generated. This is due in part to the clustering that is inherent to the problem of generating overlay maps, detracting developers and experts from the matter of how to iteratively calculate and recalculate overlay maps in an efficient manner. State of the art methods such as the one according to EP 2 070 006 may address problems of zooming, but lack provisions to address the matter of adding and/or removing layers. As a result, in methods according to the state of the art, any change in the selection of layers leads to computationally intensive operations and/or manually laborious actions of the user, which may be circumvented by the present invention.

Further preferred embodiments and their advantages are provided in the detailed description and the dependent claims

DETAILED DESCRIPTION OF THE INVENTION

In this document, the term "GIS" refers to geographic information system, a term describing any information system and related method that integrates, stores, edits, analyzes, shares and/or displays geographic information. In this context, GIS applications provide tools that allow users to create interactive queries (user-created searches), analyze spatial information, edit data in maps, and present the results of all these operations.

In this document, the term "vector data" refers to data which is defined with relation to a reference other than pixels, preferably defined in terms of relations between geographic coordinates, and hence may be projected on several pixel resolutions without taking into account some hard-coded reference to the pixel level. Opposed to this, in this document, "image data" refers to data organized in rows and columns, each entry corresponding to a pixel. Such data is bound to a "native" resolution given by the number of rows and the number of columns, and may not be projected on any pixel resolution without taking into account the native resolution.

In this document, the term "POI" refers to point of interest, with plural "POIs" referring to "points of interest". Hereby, a POI is a location associated with geographic coordinates, preferably two-dimensional coordinates as well as at least one attribute. For instance, a POI layer may refer to education, and its associated attribute(s) may be indicate of the nature of the POI, e.g. by the attribute being any or any combination of a Boolean variable value, an integer number and/or a real value. Three example POI layers are the following, each with indication of the individual POI categories:

1. education: school, library, kindergarten, university, college
2. sports: playground, pitch, sports_centre, stadium, swimming_pool
3. health: pharmacy, doctors, dentist, optician, hospital Other example POI layers may relate to public facilities (e.g. post box), shopping, accommodation, food, culture, travelling, transport (e.g. parking).

The example may further involve attributes of following boundary-based layers, whereby values of these attributes may e.g. be carried over to the buffers or expanded buffers based on location: purchasing power, migration saldo, number of corporates (=companies, legal entities, entrepreneurs), unemployment rate, percentage and/or number of criminal cases solved. Each of these layers may be organized e.g. by municipality, region, district or province.

The POI may or may not be associated to a single coordinate without contour definition, e.g., the POI may be equivalent to a single point on the map. Alternatively and/or additionally, the POI may be associated to a certain contour, e.g., the POI may be some area on the map. In such case, this contour may or may not be combined with a centroid defining a central coordinate for the POI, whereby the centroid can be defined separate from the contour or may be derived as center of the contour, which is e.g. possible when the contour is provided with one or more coordinates defining its location. In the case where the POI is associated to a certain contour, the maximum dimension of the POI is preferably not larger than 10 km, more preferably not larger than 5 km, even more preferably not larger than 2 km, most preferably not larger than 1 km and/or the area of the POI is preferably not larger than 1 km$^2$, more preferably not larger than 0.5 km$^2$, most preferably not larger than 0.2 km$^2$. Related, a "POI layer" relates to data comprised in the location data which is associated with the given POIs via one or more attributes relating to said POI layer. For instance, a POI layer may relate to "education", and the one or more attributes may relate to given POIs being a school, library, kindergarten, university or college.

In this document, the term "geographic boundaries" relates to boundaries of any kind that may allow to split a geographic area of interest, for instance a nation, in separate areas, also referred to as "boundary-based areas". This preferably relates to boundaries of well-known administrative, official or colloquial nature, such as provinces, regions or municipalities, which are all comprised in the broad class of possible boundary-based areas. Related, a "boundary-based layer" relates to data comprised in the location data which is associated with the given areas via one or more attributes relating to said boundary-based layer. For instance, a boundary-based layer may relate to "migration saldo", and the one or more attributes may relate to given areas having a certain level of net migration (in number of inhabitants) over a given time period, e.g., the net migration over the last year, the last ten years, or during a given year.

In this document, the term "overlay map" is an umbrella term for any type of map that may be put over a geographic area of interest in order to provide a graphical representation of data relating to the geographic area, including "heat maps" and "choropleth maps". Particularly, certain portions of the geographic area, such as POIs or boundary-based areas, may be associated with attribute values whose value may be displayed. In case of a choropleth maps, if the data to be represented concerns a single numeric value associated with a given boundary-based area, this value may be displayed according to a color ramp which may or may not be provided by the user. In the case of a heat map, such a straightforward representation is not available, because heat map generation inherently requires some form or clustering, which may be more or less adequate and/or more or less computationally effective depending on the assumptions.

In GIS applications, a "buffer" for a feature is a virtual zone around the feature or a point of the feature (such as a centroid). A feature may refer to a POI, an area, a boundary-based area, a building, or the like. A feature may be defined by a single set of coordinates (a point) or a contour. When the feature is defined by a contour, the buffer may be a virtual zone based on the boundary of the contour, or may be a virtual zone based on the point of the feature, such as a centroid of the contour or an entrance for a building in case of a contour of the building, for example. A buffer may be defined via a buffer size, preferably in units of distance or time, such as a distance radius around the feature or the point of the feature. A buffer is suitable for proximity analysis of several features. A buffer for a feature may inherit an attribute of the feature. A buffer may be used for aggregation of multiple features. In case of aggregation of features, a joint aggregate buffer may be created, for example via dissolving of overlapping buffers or via any other suitable heuristic rule. A joint aggregate buffer may adopt attributes of the buffers and/or features on which it is based according to one or more predefined heuristic rules.

A buffer may be used, for example, to decide whether each feature should be displayed separately in an overlay map or whether several features should be displayed via a joint aggregate feature in an overlay map. One of ordinary skill in the art will appreciate that in respect of this example, the buffer size may depend on the zoom level. An example is a query for "restaurant" by a user, whereupon an overlay of icons may be created, whereby depending on the zoom level and proximity of restaurants, an icon may relate to one or multiple restaurants.

An "index scale" refers to a mapping of a pixel score of image data for visual representation. An index scale comprises an input domain. For image data to be suitable for the index scale, each pixel score of the image data needs to lie in the input domain of the index scale. An example of an index scale is a 16-bit grayscale, which has as input domain integers in the range from 0 to 15; or floating point numbers in the range [0, 16]. For the latter, flooring of the floating point numbers to integers may be performed and/or is implicitly assumed. Another example of an index scale is a red-green-blue (RGB) scale, which has as input domain tuples of three integers each in the range from 0 to 255; or tuples of three floating point numbers in the range [0, 256]. For the latter, flooring of the floating point numbers to integers may be performed and/or is implicitly assumed. For example, in case the index scale is a 16-bit grayscale, the image data may be an array of integers in the range 0 to 15; an array of floating point numbers in the range [0, 16]; or digital interpolation data enabling to calculate for each row and column a floating point number in the range [0, 16]. An index scale may also be a virtual index scale, comprising an input domain and an output range, whereby the output range is itself suitable as input for a color ramp.

The "normalization" of data according to an index scale refers to a mapping, most preferably a linear mapping, of the data to new data in the input domain of the index scale. For example, normalization of an array of floating point numbers according to a 16-bit grayscale may involve determining a lower bound (LB) and an upper bound (UB) for the floating point numbers in the array, and the conversion of each entry (X) as follows: $X \rightarrow X'=16(X-LB)/(UB-LB)$. For example, normalization of a weighted sum of layers of image data, each layer of which is suitable as input for a particular index scale, whereby all weights are positive (e.g. all weights are equal to 1), may be performed by dividing the weighted sum by the sum of the weights. Alternatively, a lower bound (LB) and an upper bound (UB) may be determined for the pixels of the weighted sum, and the normalization may be performed as described above according to the lower and upper bounds. In a first aspect, the invention provides a computer-implemented method for creating an overlay map, preferably a heat map, comprising:

receiving at a server a user request for creation of the overlay map;

loading vector data at the server comprising location data, the location data comprising at least one attribute;

converting the vector data to image data composed of pixels according to an index scale;

applying the converted image data to a color ramp; and creating the overlay map based on the converted image data and the color ramp;

wherein said vector data is organized according to a plurality of layers, the location data comprising at least one attribute for each layer;

wherein said user request comprises a selection of at least two layers of said plurality of layers;

wherein said loading of vector data is based on said selection of layers;

wherein said converting of the vector data is performed for each of said selected layers, yielding image data layers composed of pixels for each of said selected layers; and wherein said converting the vector data to image data according to the index scale comprises the sub-steps of:

for each of said selected image data layers, calculating a pixel score for each pixel of the image data layer by performing a convolution operation relating to said location data;

merging the selected image data layers to single-image data by calculating, for each pixel, a merged score based on the pixel score of the corresponding pixel for each of said selected at least two layers, preferably according to a weighted sum;

normalizing said merged scores of said single-image data according to said index scale for obtaining normalized scores being said converted image data.

In a preferred embodiment, said sub-step of calculating said pixel score comprises storing said pixel score in a memory; wherein said method comprises the further steps of receiving at said server a second user request for updating of the overlay map, said second user request comprising a second selection different from said selection yet having at least one layer in common with said selection; and updating the image data in view of said second selection, wherein for each of said at least one layer belonging to both said selection and said second selection, said calculating of said pixel score is simplified and/or avoided by loading said pixel score from said memory.

In such an embodiment, the agility with respect to adding or removing of layers contributes to reduced computational burden and an improved user experience. This leads to agility with respect to the addition of new layers but also leads to a more user-friendly and transparent creation of heat maps, wherein the user is able, up to a certain degree, to experiment with the impact of adding or removing layers, preferably in real time. This may lead to a user-friendly way of editing heat maps, wherein the user may arrive faster at an accurate heat map representation of data with which the user is preferably familiar.

In a preferred embodiment, wherein said merging is performed according to a weighted sum, said sub-step of calculating said pixel score comprises storing said pixel score in a memory, wherein further a normalization factor associated with said step of normalizing, and optionally weights associated with the weighted sum, are stored in said memory. The storing of weights is optional, as a weight may also be known without active storage, for example when all weights are equal to one, or when a weight is unambiguously associated with a layer, e.g. via a property, an annotation, an attribute, a type of layer, or the like. The method comprises the further step of receiving at said server a second user request for updating of the overlay map. The second user request comprises a second selection different from said selection in at least one absent layer present in said selection but not in said second selection and zero, one or more new layers present in said second selection but not in said selection. The image data is then updated in view of said second selection. This may be performed by removing from the converted image data pixel score contributions from each of said at least one absent layer and adding pixel score contributions from each of said zero, one or more new layers. For each of said at least one absent layer, said calculating of said pixel score is avoided by loading said pixel score from said memory. In case a pixel score of a new layer is stored on said memory, it is preferably loaded from said memory, thereby also avoiding recalculation.

In a first further preferred embodiment of the above embodiment, the method comprises the further step of updating the image data in view of said second selection, comprising the steps of:

denormalizing the pixel scores of said converted image data based on the normalization factor stored in said memory, thereby obtaining intermediate image data;

updating each pixel score of the intermediate image data by:

subtracting therefrom the corresponding pixel score of each of said at least one absent layer stored in said memory, optionally weighted with the corresponding weight, whereby calculating of a pixel score for an absent layer is avoided by loading said pixel score from said memory;

for each of said zero, one or more new layers, adding thereto the corresponding pixel score of an image data layer corresponding to the new layer, optionally weighted with a corresponding weight, thereby obtaining new single-image data; and normalizing said updated scores of said new single-image data according to said index scale, thereby obtaining new converted image data.

In a second further preferred embodiment of the above embodiment, the method comprises the further step of updating the image data in view of said second selection, comprising the steps of:

updating each pixel score of the converted image data by:

subtracting therefrom the corresponding pixel score of each of said at least one absent layer, weighted based on said normalization factor, and optionally the corresponding weight, optionally stored in said memory, whereby calculating of a pixel score for an absent layer is avoided by loading said pixel score from said memory;

for each of said zero, one or more new layers, adding thereto the corresponding pixel score of an image data layer corresponding to the new layer, weighted based on said normalization factor stored in said memory, and optionally a corresponding weight, thereby obtaining new single-image data; and normalizing said updated scores of said new single-image data according to said index scale, thereby obtaining new converted image data.

When many layers are merged for the converted image data, the number of computations for a second selection may be drastically reduced by only taking the differences of the second selection with respect to the (first) selection into account. For intersection analysis, where multiplication of pixel scores is performed, this is not possible as typically many pixel scores are zero or nearly zero. Division of pixel scores of aggregate image data by pixel scores of an image data layer would lead to large error accumulations (for pixel scores which are nearly zero) or meaningless results (for pixel scores which are equal to zero). Moreover, division is from a computational perspective a significantly more expensive operation than addition, subtraction and multiplication, leading to significantly less performance improvement.

In a preferred embodiment, said user request further comprises a desired aggregation type, said aggregation type relating at least to pre-defined geographic boundaries; wherein said selection of at least two layers comprises at least one boundary-based layer comprising a plurality of areas, each area relating to at least one area attribute; wherein said overlay map is preferably a choropleth map or a heat map.

This provides the advantage of addressing efficient calculation of choropleth maps, or, preferably, heat maps based at least in part on data given according to pre-defined geographic boundaries.

In another preferred embodiment, said user request further comprises a desired aggregation type, said aggregation type relating to POIs; wherein said selection of at least two layers comprises at least one POI layer comprising a plurality of POIs, each POI relating to at least one POI attribute; wherein said overlay map is preferably a heat map.

In a preferred embodiment, said overlay map is a heat map; wherein for each of said at least one POI layer, said calculating of said pixel score comprises for each POI with relevance to said POI layer, creating a buffer with a buffer radius preferably equal to a user-provided buffer radius comprised in said user request;

dissolving those buffers of said created buffers that overlap, obtaining a reduced set of buffers;

for each buffer belonging to said reduced set, assigning at least one of said POI attributes to the buffer based on the location of said buffer;

preferably, calculating a centroid for each buffer belonging to said reduced set and defining an expanded buffer for each buffer based on said centroid and an expanded buffer radius preferably equal to a user-provided expanded buffer radius;

calculating said pixel score based on one or more attributes of the buffer to which the corresponding pixel belongs and/or based on one or more attributes of the buffer to which the corresponding pixel is nearest.

Such embodiment is preferably combined with a further preferred embodiment, wherein said calculating of said pixel score comprises calculating a centroid for each buffer belonging to said reduced set and defining an expanded buffer for each buffer based on said centroid and an expanded buffer radius preferably equal to a user-provided expanded buffer radius;

calculating said pixel score based on one or more attributes of the one or more expanded buffers to which the corresponding pixel belongs.

This may be advantageous in that said heat map creation is tackled in a hierarchic fashion, all with agility with respect to the addition of layers. A further advantage of said dissolving of buffers is that the number of POIs may be reduced, leading to a further improved reduction of computational burden, while retaining sufficient accuracy of the obtained heat map with respect to local extrema, which is a prime feature of heat maps.

In a preferred embodiment, said overlay map is a heat map; wherein selection of at least two layers comprises at least one boundary-based layer comprising a plurality of areas, each area relating to at least one area attribute; wherein each of said at least one boundary-based layer comprises an area centroid for each area; and wherein said calculating of said pixel score comprises for each area, defining an area buffer based on the area centroid;

calculating said pixel score based on one or more attributes of the one or more area buffers to which the corresponding pixel belongs.

This provides further agility with respect to the addition of new layers.

In another preferred embodiment, for each of the selected image data layers, said calculating of the pixel score comprises at least the calculation of a sample mean of one of said at least one attribute of the layer, said sample mean relating to the average of said one of said at least one attribute with respect to the layer; wherein said pixel score is based at least on the attribute value for the corresponding pixel and on said sample mean. This may preferably be combined with a further preferred embodiment wherein, for each of the selected image data layers, said calculating of the pixel score further comprises the calculation of a sample standard deviation of one of said at least one attribute of the layer, said sample standard deviation relating to a difference with said sample mean of said one of said at least one attribute with respect to the layer; and wherein said pixel score is further based on said sample standard deviation.

This may be advantageous in that the scores or layers may be rescaled, allowing for better comparison with scores originating from other layers.

In a further preferred embodiment, for each of the selected image data layers, said pixel score is a z-score, wherein, for each pixel, said merged score concerns the weighted sum of the z-scores of each of the layers, preferably the sum of the z-scores of each of the layers. Herein, said z-score is the difference of said one of said at least one attribute of the layer and said sample mean divided by said sample standard deviation.

This may be advantageous in that the scores or layers are rescaled according to a well-known numeric recipe, allowing for plain summing of scores across layers. This leads to agility with respect to the addition of new layers but also leads to a more user-friendly and transparent creation of heat maps, wherein the user is able, up to a certain degree, to predict the impact of adding or removing layers based on prior experience with the data. This may lead to a user-friendly way of editing heat maps, wherein the user may arrive faster at an accurate heat map representation of data with which the user is preferably familiar.

In another preferred embodiment, said sub-step of calculating said pixel score being the z-score comprises storing said z-score in a memory for each of said selected layers; wherein said method comprises the further steps of receiving at said server a second user request for updating of the overlay map, said second user request comprising a second selection different from said selection yet having at least one layer in common with said selection; and updating the image data in view of said second selection, wherein for each of said at least one layer belonging to both said selection and said second selection, said calculating of said z-score is avoided by loading said z-score from said memory.

This may be advantageous in that it allows faster updating of the updated heat map, providing the user with a user-friendly tool to quickly add and remove layers and experimentally arrive at clear and/or accurate heat maps.

The invention is further described by the following non-limiting example which further illustrates the invention, and is not intended to, nor should it be interpreted to, limit the scope of the invention.

EXAMPLES

Figure 1:
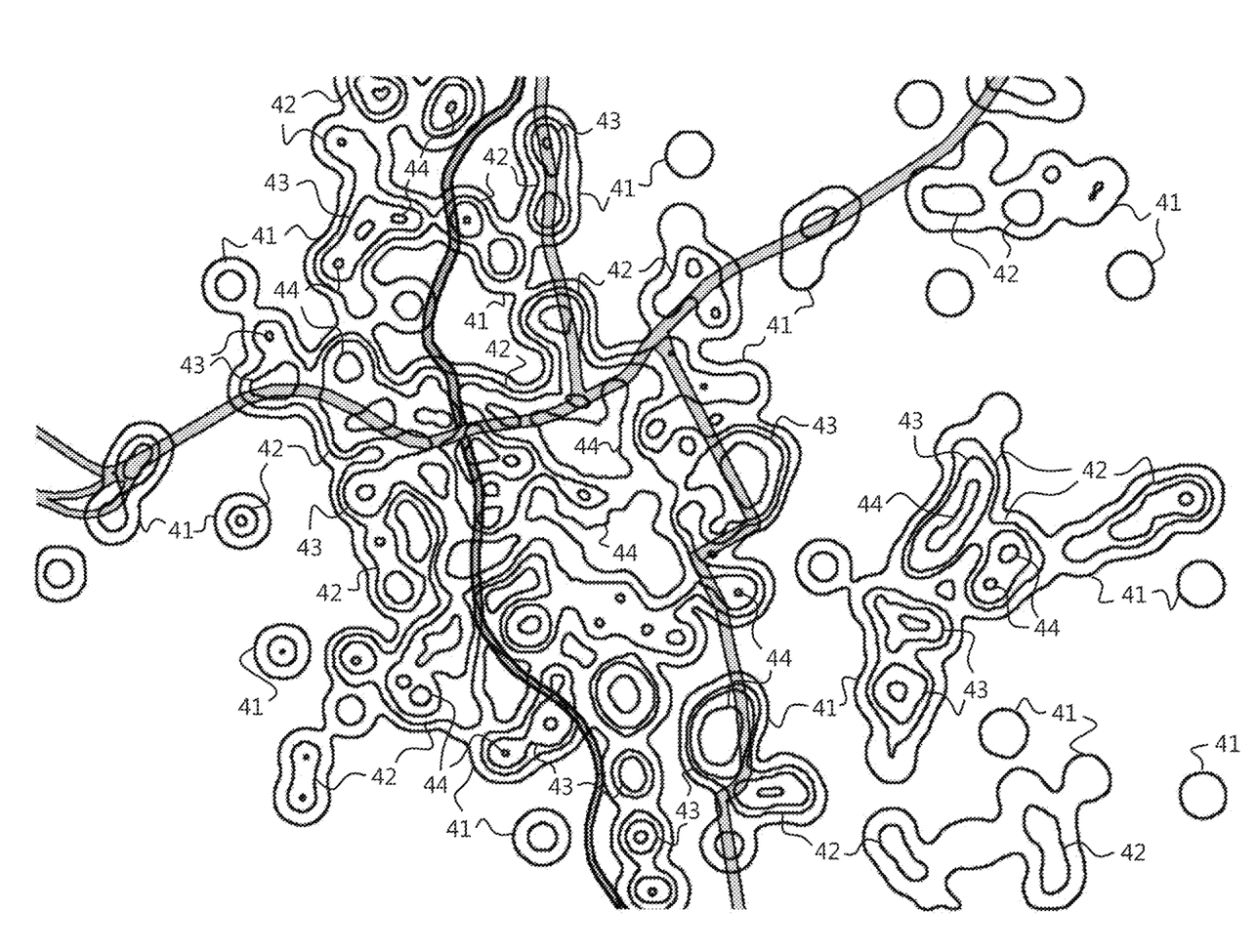
FIG. 1 displays an example heat map generated according to the present invention.

Example 1: Example of Heat Map Creation for Indicating Locality's Attractiveness FIG. 1 displays an example heat map generated according to the present invention. The heat map is generated based on 10 POI layers and 5 boundary-based layers, all with Slovakia or parts of Slovakia as geographic area of interest. The heat map of FIG. 1 is an illustration whereby the geographic region of interest is the city of Prešov and surrounding area. (Two main roads and the river Torysa are indicated for illustration purposes.)

The heat map provides an instrument of data analysis with respect to an index of the locality's attractiveness. This index is used as weight for the heat map. In other words, the original vector data comprising the 10 POI layers and 5 boundary-based layers is converted to image data composed of pixels, each pixel value corresponding to a value of the index of the locality's attractiveness for the location corresponding with the given pixel. Hereby, the index scale is such that the index of the locality's attractiveness is a value ranging between 0 and 100.

The heat map as indicated on FIG. 1 is a black-and-white interpretation of the heat map, which is actually intended to be printed according to a color ramp. The black-and-white interpretation exhibits contour lines according to a first, second, third and fourth threshold 41-44, respectively, with threshold ranked in increasing order, each threshold being larger than zero and smaller than 100. Example values for the thresholds may be e.g. 20, 40, 60, 80, respectively, or 30, 50, 70, 90, respectively, alternatively.

As shown on FIG. 1, the heat map provides many zones for which the index drops below a first threshold value 41 of the index. In the colored heat map, these zones are displayed transparently, i.e. the overlay map is transparent.

For values of the index between the first threshold 41 and the second threshold 42, the index value is low. In the colored heat map, these zones may be displayed in a first range of colors, e.g. relating to the blue portions of the color spectrum, wherein higher values of the index value "tend" to more greenish shades.

For values of the index between the second threshold 42 and the third threshold 43, the index value is medium. In the colored heat map, these zones may be displayed in a second range of colors, e.g. relating to the green portions of the color spectrum, wherein higher values of the index value "tend" to more yellowish shades.

For values of the index between the third threshold 43 and the fourth threshold 44, the index value is high. In the colored heat map, these zones may be displayed in a third range of colors, e.g. relating to the yellow portions of the color spectrum, wherein higher values of the index value "tend" to more orange shades.

For values of the index above the fourth threshold 44, the index value is very high. In the colored heat map, these zones may be displayed in a fourth range of colors, e.g. relating to the orange portions of the color spectrum, wherein higher values of the index value "tend" to more red shades.

Overall, the heat map, being an overlay map, is created according to following method. First, there is the receiving at a server of a user request for creation of the overlay map. The user request comprises a selection of at least two layers of said plurality of layers, indicating for which POI layers the user wants to have the heat map generated.

Next, loading the vector data at the server takes place. The vector data comprises location data, the location data comprises at least one attribute per layer. The loading of vector data is based on said selection of layers, preferably only loading the vector data for the layers which the user selected.

Then, the vector data is converted to image data composed of pixels according to an index scale. "Image data" here refers merely to a matrix of rows and columns comprising the index values. This matrix is then "interpreted" as image data, by letting each entry correspond to a pixel and by applying the color ramp, yielding the heat map.

Particular for the invention is that said converting of the vector data is performed for each of said selected layers, yielding image data layers composed of pixels for each of said selected layers. This is to be interpreted as the broadest interpretation possible, whereby the actual calculation of the data may be performed according to different preferred embodiments.

The converting of the vector data to image data according to the index scale comprises several sub-steps. First, for each of said selected image data layers, a pixel score is calculated for each pixel of the image data layer by performing a convolution operation relating to said location data. In particular, for each selected POI layer, a buffer is created with a buffer radius of 25 m. This may essentially be circles (if the POI is a single point on the map) but typically these buffers have some smooth shape calculated based on the contour of the POI. This value may be predefined but may be also given by the user as comprised in said user request. Then, those buffers of said created buffers that overlap are dissolved, obtaining a reduced set of buffers. For instance, the merge of two circle-shaped buffers may have an 8-shaped contour; in general, the dissolved buffers may take on many shapes depending on the number of involved buffers and their respective shapes. Next, a separate step which may depend on the GIS application context ensures that the newly created buffers are individually addressable. In one embodiment, this operation is referred to as "multipart to singleparts". For each buffer belonging to said reduced set, in a next step, at least one of the POI attributes is assigned to the buffer based on the location of the buffer. Finally, for each of these dissolved buffers, a centroid is calculated. These newly calculated centroids then serve to define an expanded buffer for each buffer based on said centroid and an expanded buffer radius equal to 250 m. This value is preferably equal to a user-provided expanded buffer radius.

In a next step, the pixel score may be calculated based on the relation of the pixel with respect to the expanded buffers. Each of the expanded buffers having inherited the attributes of the dissolved buffers, the pixel score may relate to all the attributes of the expanded buffers to which the pixel belongs. Hereby, this may for instance relate to a discrete number of POIs assigned to the dissolved buffer and then carried over to the expanded buffer. For each layer, this number may be first processed in relation to all other numbers associated with other expanded buffers belonging to the same POI layer, to obtain a z-score. The pixel score for a pixel with respect to a given layer may then be a z-score.

In a next step, the z-scores of individual layers are merged, to obtain a final sum of z-scores for each pixel. Note that in the above, the sum of z-scores may be obtained as a sum of z-scores per pixel per layer, but that the sum of z-scores per pixel may, according to an alternative embodiment, also be obtained by applying an aggregation of the z-scores with respect to each centroid across layers, to then lead to a z-score at pixel level.

The final sum of z-scores is eventually processed according to some scaling function in order for the range of the obtained index being between 0 and 100.

From this example, it may further be clear that the newly defined expanded buffers enable to cover a large majority of the geographic area of interest, or even the entire area may be covered. This shows the importance of an adequate clustering strategy when addressing the problem of creating a heat map.

With respect to the different POI layers, the example of FIG. 1 is based on 10 POI layers. Three example POI layers are the following, each with indication of the individual POI categories:

1. education: school, library, kindergarten, university, college
2. sports: playground, pitch, sports_centre, stadium, swimming_pool
3. health: pharmacy, doctors, dentist, optician, hospital Other example POI layers may relate to public facilities (e.g. post box), shopping, accommodation, food, culture, travelling, transport (e.g. parking).

The example may further involve attributes of following boundary-based layers, whereby values of these attributes may e.g. be carried over to the buffers or expanded buffers based on location: purchasing power, migration saldo, number of corporates, unemployment rate, number of criminal cases solved. Each of these layers may be organized e.g. by municipality, region, district or province.

In some cases, it may be desirable to ensure that the heat map has data for all portions of a geographic area of interest. In those cases, additional attributes of existing POI layers and/or new POI layers may be considered.

A further advantage of said dissolving of buffers is that the number of POIs may be reduced, leading to a further improved reduction of computational burden, while retaining sufficient accuracy of the obtained heat map with respect to local extrema, which is a prime feature of heat maps.

The invention claimed is:

1. Computer-implemented method for creating an overlay map, preferably a heat map, comprising:
  receiving at a server a user request for creation of the overlay map;
  loading vector data at the server comprising location data, the location data comprising at least one attribute;
  converting the vector data to image data composed of pixels according to an index scale, wherein the index scale is a mapping of a pixel score of image data for visual representation, wherein the index scale comprises an input domain, wherein each pixel score of the image data needs to be comprised in the input domain;
  applying the converted image data to a color ramp; and
  creating the overlay map based on the converted image data and the color ramp;
    wherein said vector data is organized according to a plurality of layers, the location data comprising at least one attribute for each layer;
    wherein said user request comprises a selection of at least two layers of said plurality of layers;
    wherein said loading of vector data is based on said selection of layers;
    wherein said converting of the vector data is performed for each of said selected layers, yielding image data layers composed of pixels for each of said selected layers; and
    wherein said converting the vector data to image data according to the index scale comprises the sub-steps of:
      for each of said selected image data layers, calculating a pixel score for each pixel of the image data layer by performing a convolution operation relating to said location data;
      merging the selected image data layers to single-image data by calculating, for each pixel, a merged score based on the pixel score of the corresponding pixel for each of said selected at least two layers;
    wherein the merged score is calculated according to a weighted sum based on the pixel score of the corresponding pixel for each of said selected at least two layers, wherein the weighted sum is based on weights, wherein each weight is associated with a layer, such as association via an annotation or a layer type; and in that said converting the vector data to image data according to the index scale comprises the sub-step of:

normalizing said merged scores of said single-image data according to said index scale for obtaining normalized scores being said converted image data.

2. Method according to claim 1, wherein said sub-step of calculating said pixel score comprises storing said pixel score in a memory; and in that said method comprises the further steps of
receiving at said server a second user request for updating of the overlay map, said second user request comprising a second selection different from said selection yet having at least one layer in common with said selection; and
updating the image data in view of said second selection, wherein for each of said at least one layer belonging to both said selection and said second selection, said calculating of said pixel score is avoided by loading said pixel score from said memory.

3. Method according to claim 1,
wherein said sub-step of calculating said pixel score comprises storing said pixel score in a memory; and in that said method comprises the further steps of
receiving at said server a second user request for updating of the overlay map, said second user request comprising a second selection different from said selection in at least one absent layer present in said selection but not in said second selection and zero, one or more new layers present in said second selection but not in said selection; and
updating the image data in view of said second selection, by removing from the converted image data pixel score contributions from each of said at least one absent layer and adding pixel score contributions from each of said zero, one or more new layers, wherein for each of said at least one absent layer, said calculating of said pixel score is avoided by loading said pixel score from said memory.

4. Method according to claim 1, wherein said sub-step of calculating said pixel score comprises storing said pixel score in a memory; in that a normalization factor associated with said step of normalizing, and optionally weights associated with the weighted sum, are stored in said memory; and in that said method comprises the further steps of
receiving at said server a second user request for updating of the overlay map, said second user request comprising a second selection different from said selection in at least one absent layer present in said selection but not in said second selection and zero, one or more new layers present in said second selection but not in said selection; and
updating the image data in view of said second selection, comprising the steps of:
denormalizing the pixel scores of said converted image data based on the normalization factor stored in said memory, thereby obtaining intermediate image data; and
updating each pixel score of the intermediate image data by:
subtracting therefrom the corresponding pixel score of each of said at least one absent layer stored in said memory, optionally weighted with the corresponding weight, whereby calculating of a pixel score for an absent layer is avoided by loading said pixel score from said memory;
for each of said zero, one or more new layers, adding thereto the corresponding pixel score of an image data layer corresponding to the new layer, optionally weighted with a corresponding weight, thereby obtaining new single-image data; and
normalizing said updated scores of said new single-image data according to said index scale, thereby obtaining new converted image data.

5. Method according to claim 1, wherein said sub-step of calculating said pixel score comprises storing said pixel score in a memory; in that a normalization factor associated with said step of normalizing, and optionally weights associated with the weighted sum, are stored in said memory; and in that said method comprises the further steps of
receiving at said server a second user request for updating of the overlay map, said second user request comprising a second selection different from said selection in at least one absent layer present in said selection but not in said second selection and zero, one or more new layers present in said second selection but not in said selection; and
updating the image data in view of said second selection, comprising the steps of:
updating each pixel score of the converted image data by:
subtracting therefrom the corresponding pixel score of each of said at least one absent layer, weighted based on said normalization factor, and optionally the corresponding weight, optionally stored in said memory, whereby calculating of a pixel score for an absent layer is avoided by loading said pixel score from said memory;
for each of said zero, one or more new layers, adding thereto the corresponding pixel score of an image data layer corresponding to the new layer, weighted based on said normalization factor stored in said memory, and optionally a corresponding weight,
thereby obtaining new single-image data; and
normalizing said updated scores of said new single-image data according to said index scale, thereby obtaining new converted image data.

6. Method according to claim 1,
wherein said user request further comprises a desired aggregation type, said aggregation type relating at least to pre-defined geographic boundaries; in that said selection of at least two layers comprises at least one boundary-based layer comprising a plurality of areas, each area relating to at least one area attribute;
wherein said overlay map is preferably a choropleth map or a heat map.

7. Method according to claim 6, wherein said overlay map is a heat map; in that selection of at least two layers comprises at least one boundary-based layer comprising a plurality of areas, each area relating to at least one area attribute; in that each of said at least one boundary-based layer comprises an area centroid for each area; and in that said calculating of said pixel score comprises
for each area, defining an area buffer based on the area centroid, wherein an area buffer for an area is a virtual zone around the area centroid, the area buffer for said area relating to said at least one area attribute of said area;
calculating said pixel score based on one or more attributes of the one or more area buffers to which the corresponding pixel belongs.

8. Method according to claim 1,
wherein said user request further comprises a desired aggregation type, said aggregation type relating to POIs; in that said selection of at least two layers comprises at least one POI layer comprising a plurality of POIs, each POI relating to at least one POI attribute; wherein said overlay map is preferably a heat map.

9. Method according to claim 8, wherein said overlay map is a heat map; and in that for each of said at least one POI layer, said calculating of said pixel score comprises for each POI with relevance to said POI layer, creating a buffer with a buffer radius preferably equal to a user-provided buffer radius comprised in said user request, wherein a buffer for a POI is a virtual zone around the POI or around a point related to the POI;

dissolving those buffers of said created buffers that overlap, obtaining a reduced set of buffers;

for each buffer belonging to said reduced set, assigning at least one of said POI attributes to the buffer based on the location of said buffer;

preferably, calculating a centroid for each buffer belonging to said reduced set and defining an expanded buffer for each buffer based on said centroid and an expanded buffer radius preferably equal to a user-provided expanded buffer radius;

calculating said pixel score based on one or more attributes of the buffer to which the corresponding pixel belongs and/or based on one or more attributes of the buffer to which the corresponding pixel is nearest.

10. Method according to claim 9, wherein said calculating of said pixel score comprises calculating a centroid for each buffer belonging to said reduced set and defining an expanded buffer for each buffer based on said centroid and an expanded buffer radius preferably equal to a user-provided expanded buffer radius;

calculating said pixel score based on one or more attributes of the one or more expanded buffers to which the corresponding pixel belongs.

11. Method according to claim 1 wherein, for each of the selected image data layers, said calculating of the pixel score comprises at least the calculation of a sample mean of one of said at least one attribute of the layer, said sample mean relating to the average of said one of said at least one attribute with respect to the layer; and in that said pixel score is based at least on the attribute value for the corresponding pixel and on said sample mean.

12. Method according to claim 11, wherein for each of the selected image data layers, said calculating of the pixel score further comprises the calculation of a sample standard deviation of one of said at least one attribute of the layer, said sample standard deviation relating to a difference with said sample mean of said one of said at least one attribute with respect to the layer; and in that said pixel score is further based on said sample standard deviation.

13. Method according to claim 12, wherein for each of the selected image data layers, said pixel score is a z-score, said z-score being the difference of said one of said at least one attribute and said sample mean divided by said sample standard deviation, and in that, for each pixel, said merged score concerns the weighted sum of the z-scores of each of the layers, preferably the sum of the z-scores of each of the layers.

14. Method according to claim 13, wherein said sub-step of calculating said pixel score being the z-score comprises storing said z-score in a memory for each of said selected layers; in that said method comprises the further steps of receiving at said server a second user request for updating of the overlay map, said second user request comprising a second selection different from said selection yet having at least one layer in common with said selection; and updating the image data in view of said second selection, wherein for each of said at least one layer belonging to both said selection and said second selection, said calculating of said z-score is avoided by loading said z-score from said memory.

15. A system for creating an overlay map, comprising:

a server coupled to a network;

a database accessible by the server, the database comprising vector data comprising location data, the location data comprising at least one attribute;

preferably, a user device, and an application coupled to the server;

wherein the application is configured for executing a method for creating an overlay map comprising the steps of:

receiving at the server and via the network, preferably from said user device, a user request from a user for creation of the overlay map;

loading vector data from the database at the server;

converting the vector data to image data composed of pixels according to an index scale, wherein the index scale is a mapping of a pixel score of image data for visual representation, wherein the index scale comprises an input domain, wherein each pixel score of the image data needs to be comprised in the input domain;

applying the converted image data to a color ramp; and creating the overlay map based on the converted image data and the color ramp;

wherein said vector data is organized according to a plurality of layers, the location data comprising at least one attribute for each layer;

wherein said user request comprises a selection of at least two layers of said plurality of layers;

wherein said loading of vector data is based on said selection of layers;

wherein said converting of the vector data is performed for each of said selected layers, yielding image data layers composed of pixels for each of said selected layers;

wherein said converting of the vector image to image data according to said index scale comprises the sub-steps of:

for each of said selected image data layers, calculating a pixel score for each pixel of the image data layer by performing a convolution operation relating to said location data;

merging the selected image data layers to single-image data by calculating, for each pixel, a merged score according to a weighted sum based on the pixel score of the corresponding pixel for each of said selected at least two layers, wherein the weighted sum is based on weights, wherein each weight is associated with a layer, such as association via an annotation or a layer type;

normalizing said merged scores of said single-image data according to said index scale for obtaining normalized scores being said converted image data; and wherein preferably, the application is configured for executing, as part of said method, the further step of:

sending, at said server, the overlay map to said user via said network, preferably to said user device of said user.

16. System according to claim 15, wherein the application is configured for executing, as part of said method, the further steps of:
receiving at said server a second user request for updating of the overlay map, said second user request comprising a second selection different from said selection yet having at least one layer in common with said selection;
loading vector data from the database for any layers included in the second selection but not in the first selection, if any; and
updating the image data in view of said second selection, wherein for each of said at least one layer belonging to both said selection and said second selection, said calculating of said pixel score is preferably avoided by loading said pixel score from said memory, yielding an updated overlay map;
preferably, sending, at said server, the updated overlay map to said user via said network, preferably to said user device of said user.

17. Use of a computer-implemented method for creating an overlay map, preferably a heat map, comprising:
receiving at a server a user request for creation of the overlay map;
loading vector data at the server comprising location data, the location data comprising at least one attribute;
converting the vector data to image data composed of pixels according to an index scale, wherein the index scale is a mapping of a pixel score of image data for visual representation, wherein the index scale comprises an input domain, wherein each pixel score of the image data needs to be comprised in the input domain;
applying the converted image data to a color ramp; and
creating the overlay map based on the converted image data and the color ramp;
wherein said vector data is organized according to a plurality of layers, the location data comprising at least one attribute for each layer;
wherein said user request comprises a selection of at least two layers of said plurality of layers;
wherein said loading of vector data is based on said selection of layers;
wherein said converting of the vector data is performed for each of said selected layers, yielding image data layers composed of pixels for each of said selected layers; and
wherein said converting the vector data to image data according to the index scale comprises the sub-steps of:
for each of said selected image data layers, calculating a pixel score for each pixel of the image data layer by performing a convolution operation relating to said location data;
merging the selected image data layers to single-image data by calculating, for each pixel, a merged score based on the pixel score of the corresponding pixel for each of said selected at least two layers;
wherein the merged score is calculated according to a weighted sum based on the pixel score of the corresponding pixel for each of said selected at least two layers, wherein the weighted sum is based on weights, wherein each weight is associated with a layer, such as association via an annotation or a layer type; and in that said converting the vector data to image data according to the index scale comprises the sub-step of:
normalizing said merged scores of said single-image data according to said index scale for obtaining normalized scores being said converted image data in the system according to claim 15.

* * * * *